US012257672B2

(12) United States Patent
Chen

(10) Patent No.: US 12,257,672 B2
(45) Date of Patent: Mar. 25, 2025

(54) LOCKING DEVICE FOR TOOL

(71) Applicant: INFAR INDUSTRIAL CO., LTD., Chang-Hua County (TW)

(72) Inventor: Tai Hung Chen, Chang-Hua County (TW)

(73) Assignee: INFAR INDUSTRIAL CO., LTD., Chang-Hua County (TW)

( * ) Notice: Subject to any disclaimer, the term of this patent is extended or adjusted under 35 U.S.C. 154(b) by 304 days.

(21) Appl. No.: 17/977,029

(22) Filed: Oct. 31, 2022

(65) Prior Publication Data

US 2023/0173649 A1 Jun. 8, 2023

(30) Foreign Application Priority Data

Dec. 3, 2021 (TW) ................................ 110145306
Jan. 25, 2022 (TW) ................................ 111103143

(51) Int. Cl.
*B25B 23/00* (2006.01)

(52) U.S. Cl.
CPC ...... *B25B 23/0035* (2013.01); *B25B 23/0028* (2013.01)

(58) Field of Classification Search
CPC ............ B25B 23/0035; B25B 23/0028; B25B 23/0007; B25B 23/0021; B25B 23/16
USPC ............................. 81/177.85, 438, 439, 440
See application file for complete search history.

(56) References Cited

U.S. PATENT DOCUMENTS 5,419,221 A 5/1995 Cole
5,775,184 A 7/1998 Cole
6,000,299 A 12/1999 Cole
6,101,907 A * 8/2000 McGovern ............ B25B 13/461 81/177.8
6,247,386 B1 6/2001 Gummow
6,796,385 B1 9/2004 Cobzaru et al.
7,156,003 B2 * 1/2007 Cole ...................... B25G 1/063 81/58.3
10,974,373 B2 * 4/2021 Thompson .......... B25B 23/0035
2004/0177978 A1 9/2004 Cobzaru et al.
2017/0210000 A1 * 7/2017 Lee ........................ B25G 1/063
2021/0114188 A1 * 4/2021 Ross ....................... B25B 13/46

FOREIGN PATENT DOCUMENTS

TW 413654 B 12/2000
TW M476673 U 4/2014
TW I498193 B 9/2015
TW 202103861 A 2/2021

* cited by examiner

*Primary Examiner* — Robert F Neibaur

(74) *Attorney, Agent, or Firm* — MUNCY, GEISSLER, OLDS & LOWE, P.C.

(57) ABSTRACT

A locking device for a tool includes a first component and a second component. The first component has a through hole, and an inner wall of the through hole is provided with a first engaging portion. The second component is selectively rotatably connected to the through hole and provided with a second engaging portion detachably engaged with the first engaging portion. The second component can move relative to the through hole to be switched between an unlocked position where the second engaging portion is disengaged from the first engaging portion and a locked position where the second engaging portion is engaged with the first engaging portion, so that the second component and the through hole are selectively rotatable relative to each other.

6 Claims, 11 Drawing Sheets

LOCKING DEVICE FOR TOOL

BACKGROUND

The present invention relates to a locking device and, more particular, to a locking device, which enables a tool to selectively adjust or lock a relative angle between two components of the tool.

A common tool, which can be adjusted the relative angle between two components pivotally connected each other to suit the operation environment or other needs, such as the head and the handle of a swing wrench.

However, in order to enable the two components to pivot relative to each other to adjust the relative angle, such tool generally use a pin that passes through the two components to cause the two components pivotally connected each other, but there is no a suitable locking device to provide a locking function between the two components, so that the angle between the two components will be changed due to the influence of force during the operating process, which is not conducive to continuous operation.

Thus, a need exists for a locking device to mitigate and/or obviate the above disadvantages.

SUMMARY

An objective of the present invention is to provide a locking device including a first component and a second component. The first component has a through hole. An inner wall of the through hole is provided with a first engaging portion. The second component is selectively rotatably connected to the through hole and provided with a second engaging portion detachably engaged with the first engaging portion. The second component is configured to be movable relative to the through hole to be switched between an unlocked position where the second engaging portion is disengaged from the first engaging portion and a locked position where the second engaging portion is engaged with the first engaging portion, so that the second component and the through hole are selectively rotatable relative to each other.

In an embodiment, the first engaging portion and the second engaging portion respectively have a plurality of teeth being engageable with each other.

In an embodiment, the first component defines a first end and a second end spaced from the first end. The through hole is formed on the second end and penetrates through two opposite sides of the second end along a longitudinal axis. The second component is configured to be movable relative to the through hole along the longitudinal axis to be switched between the unlocked position and the locked position. The second component has a first part and a second part connected to the first part. The second part is selectively rotatably connected to the through hole. The second engaging portion is formed on an outer periphery of the second part.

In an embodiment, the inner wall of the through hole is further provided with at least one positioning groove adjacent to the first engaging portion. The second part firms a penetrating hole along a radial direction of the longitudinal axis and includes a positioning assembly arranged in the penetrating hole. The positioning assembly selectively abuts against the at least one positioning groove as the second component moves relative to the through hole.

In an embodiment, the penetrating hole penetrates through two opposite sides of the second part. The at least one positioning groove includes first and second positioning grooves spaced from each other. The positioning assembly includes two positioning members selectively abutting against the first and second positioning grooves, and a biasing member biasing the two positioning members toward the first and second positioning grooves. The two positioning members abuts against the first positioning groove when the second component is in the unlocked position. The two positioning members abuts against the second positioning groove when the second component is in the locked position.

In another embodiment, the through hole has a small diameter section, a large diameter section communicating with the small diameter section, and an internal extended section formed at one side of the large diameter section opposite to the small diameter section. The first engaging portion is formed on the small diameter section. The second part has a large diameter portion, a small diameter portion connected to the large diameter portion, and a shoulder portion formed between the large diameter portion and the small diameter portion. The second engaging portion is formed on the large diameter portion. The locking device further includes an elastic member having two opposite ends respectively elastically abutting against the internal extended section and the shoulder portion to bias the second component toward the locked position.

In a further embodiment, the locking device further includes a third component forming a pivoting hole aligned with the through hole along the longitudinal axis. An inner wall of the pivoting hole is provided with first and second positioning grooves spaced from each other. The first part of the second component is selectively rotatably inserted through the pivoting hole and the through hole. The first part forms a penetrating hole along a radial direction of the longitudinal axis. The second component further includes a positioning assembly arranged in the penetrating hole. The positioning assembly selectively abuts against one of the first and second positioning grooves as the second component moves relative to the through hole and the pivoting hole.

In a further embodiment, the positioning assembly includes a positioning member selectively abutting against one of the first and second positioning grooves, and a biasing member biasing the positioning member toward one of the first and second positioning grooves. The positioning member abuts against the first positioning groove when the second component is in the unlocked position. The positioning member abuts against the second positioning groove when the second component is in the locked position.

Another objective of the present invention is to provide a locking device including a first component and a second component. The first component has a through hole. An inner wall of the through hole is provided with at least one positioning groove. The second component is selectively rotatably connected to the through hole and configured to be movable relative to the through hole. The second component forms a penetrating hole and includes a positioning assembly arranged in the penetrating hole. The positioning assembly selectively abuts against the at least one positioning groove as the second component moves relative to the through hole.

In an embodiment, the penetrating hole penetrates through two opposite sides of the second component. The at least one positioning groove includes first and second positioning grooves. The positioning assembly includes two positioning members selectively abutting against the first and second positioning grooves, and a biasing member biasing the two positioning members toward the first and second positioning grooves.

The present invention will become clearer in light of the following detailed description of illustrative embodiments of this invention described in connection with the drawings.

DETAILED DESCRIPTION

Figure 1:
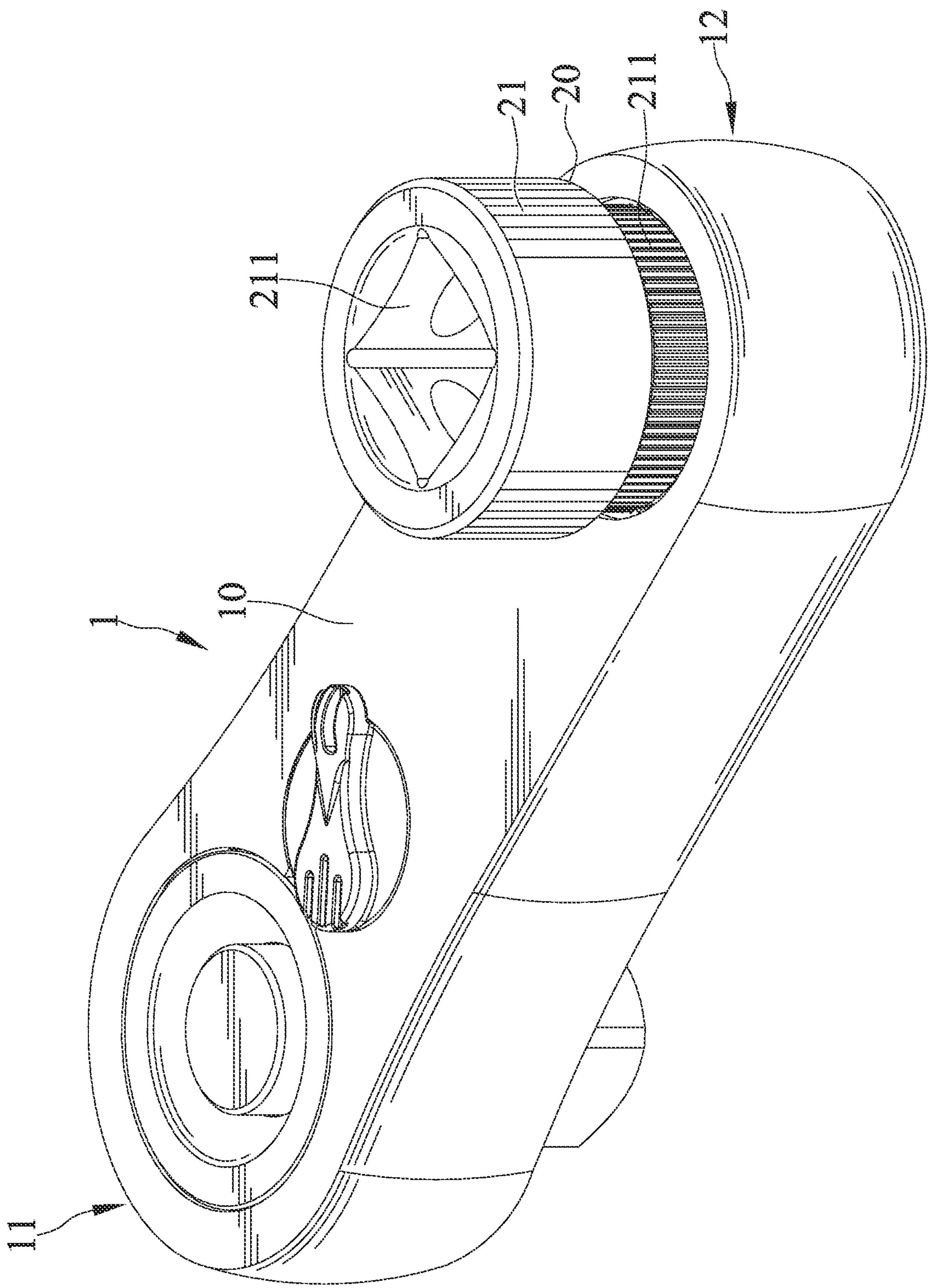
FIG. 1 is a perspective of a locking device of a first embodiment according to the present invention.
Figure 2:
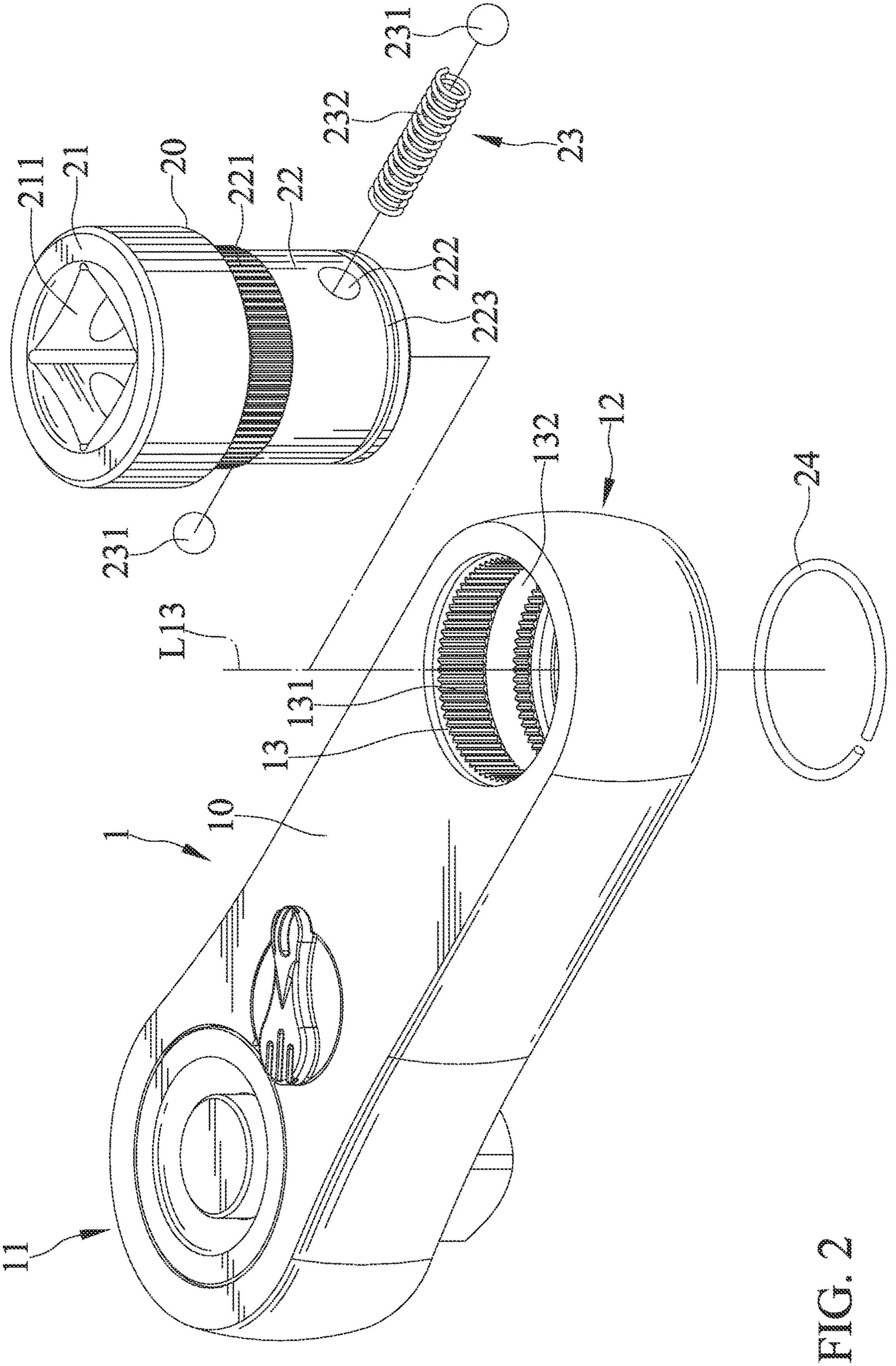
FIG. 2 is a partial exploded perspective view of the locking device of FIG. 1.
Figure 3:
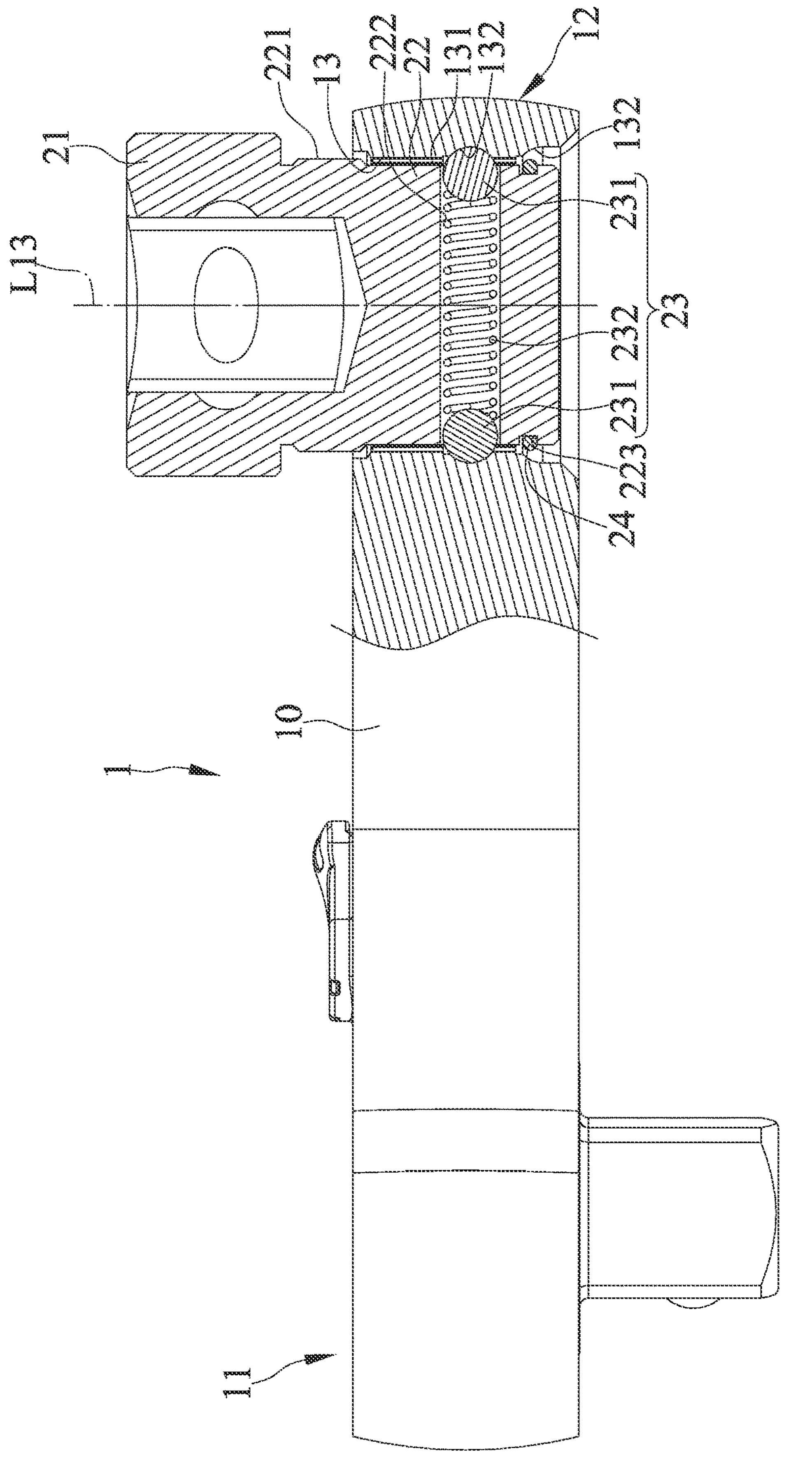
FIG. 3 is a cross sectional view of the locking device of FIG. 1 and shows the second component disposed in the unlocked position.
Figure 4:
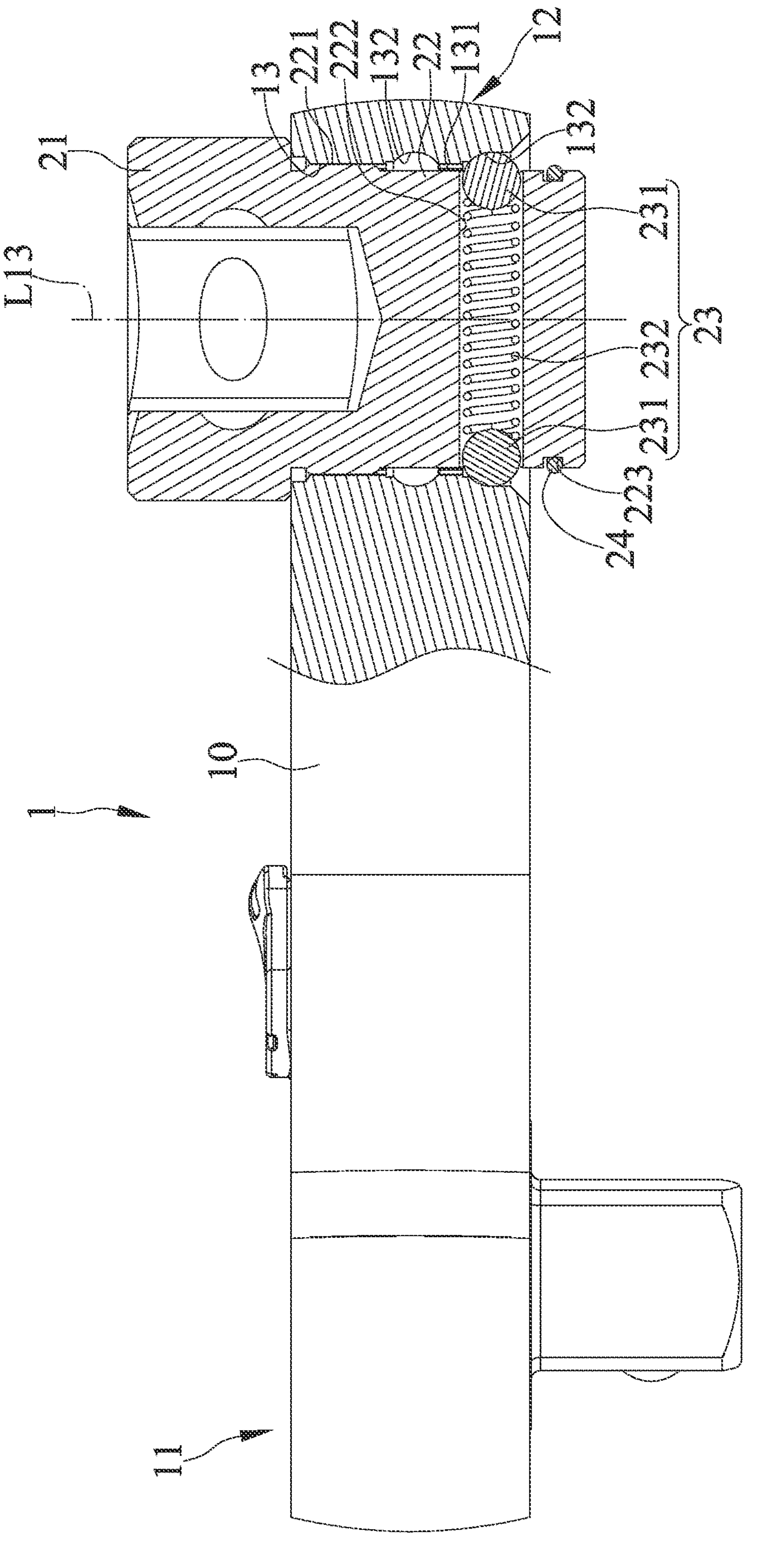
FIG. 4 is another cross sectional view of the locking device of FIG. 1 and shows the second component disposed in the locked position.

FIGS. 1-4 show a locking device 1 of a first embodiment according to the present invention. The locking device 1 includes a first component 10 and a second component 20. The first component 10 defines a first end 11 and a second end 12 spaced from the first end 11, and a through hole 13 formed on the second end 12. The inner wall of the through hole 13 is provided with a first engaging portion 131. The second component 20 has a first part 21 and a second part 22 connected to the first part 21. The second part 22 is selectively rotatably connected to the through hole 13, and a second engaging portion 221 is formed on an outer periphery of the second part 22 and detachably engaged with the first engaging portion 131. The second component 20 is configured to be movable relative to the through hole 13 to be switched between an unlocked position (FIG. 3) and a locked position (FIG. 4).

The second engaging portion 221 is disengaged from the first engaging portion 131 when the second component 20 is in the unlocked position so that the second component 20 and the through hole 13 can rotate relative to each other. The second engaging portion 221 is engaged with the first engaging portion 131 when the second component 20 is in the locked position so that the second component 20 and the through hole 13 can not rotate relative to each other.

Thereby, the user can apply force to the first component 10 when the second component 20 is in the unlocked position, after the through hole 13 and the second part 22 are relatively rotated to a desired angle, and then apply force to the second component 20 to cause the second part 22 rotated relative to the through hole 13 to switch the second component 20 into the locked position, so that the through hole 13 and the second part 22 cannot rotate relative to each other to lock the desired angle between the first component 10 and the second component 20.

Figure 5:
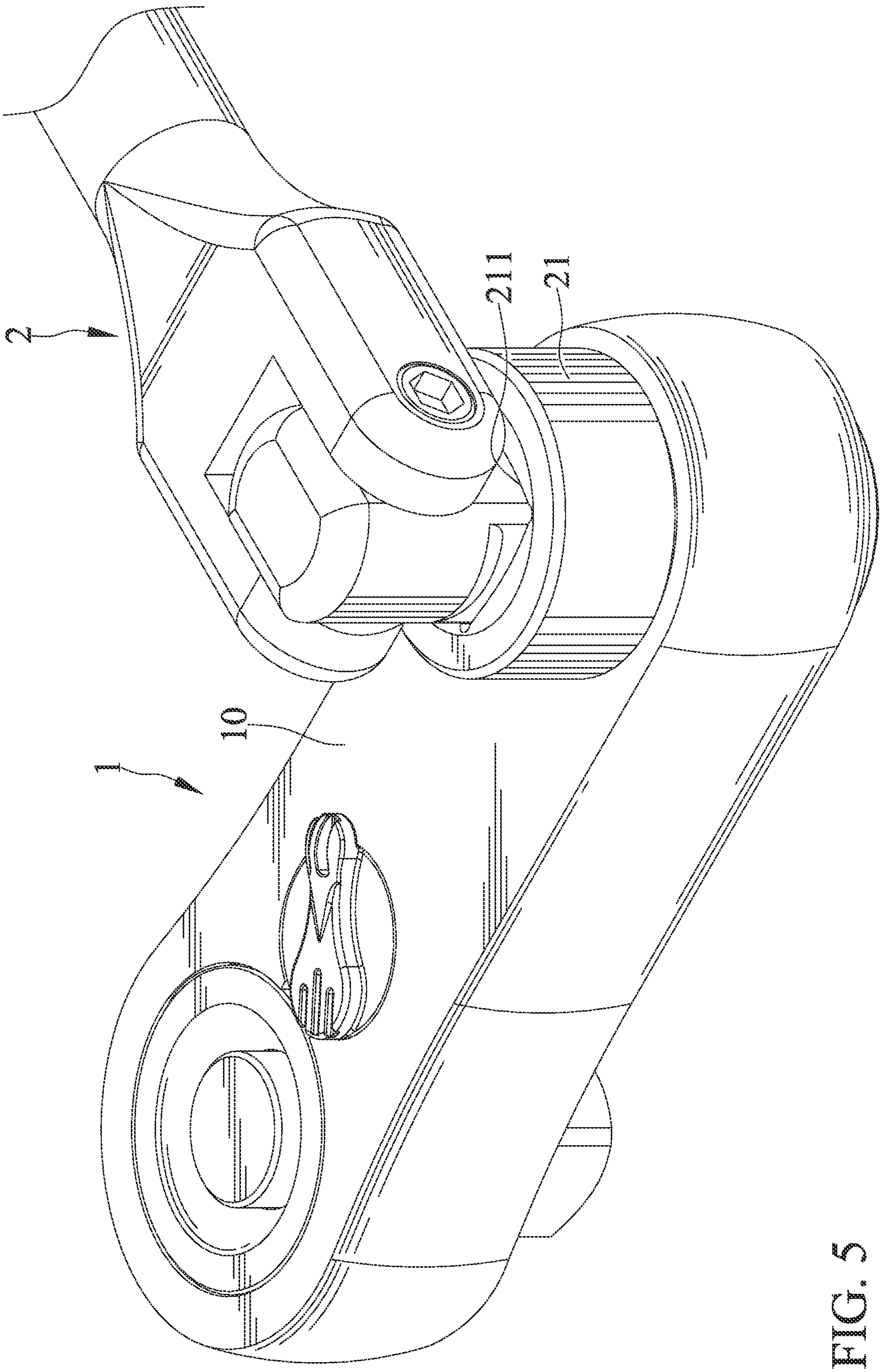
FIG. 5 is another perspective view of the locking device of FIG. 1 and shows the locking device attached to a wrench.

It can be understood that the first component 10 and the second component 20 of the locking device 1 of the present invention may be tools with different functions, such as wrenches, handles, etc., but are not limited to this exemplary tool type, and may also be used as adapters for other tools. For example, the first end 11 of the first component 10 can be adapted to attach to a driven member (not shoe n), so that the first component 10 can be a driving member to drive the driven member. Further shown in FIG. 5, the first part 21 can form a connecting portion 211 adapted to detachably connect to a wrench 2 without ratchet mechanism, and the connecting portion 211 in this embodiment may be a square hole. Therefore, the first component 10 and the second component 20 of this embodiment may form a wrench adapter device. In addition, the first end 11 may be further provided with a ratchet mechanism for driving the driven member. The ratchet mechanism may include a pawl and a ratchet wheel, and the ratchet wheel can selectively unidirectionally rotate by the engaging relationship between the pawl and the ratchet wheel. The ratchet mechanism may also be provided with a switch to change the engaging relationship between the pawl and the ratchet wheel to provided a reversing ratchet function. Therefore, the ratchet mechanism provided at the first end 11 may use the known ratchet structure, and its structure and type (reversing or unidirectional) are not limited In order to detachably engaged the second engaging portion 221 to the first engaging portion 131, the first engaging portion 131 and the second engaging portion 221 may respectively have a plurality of teeth being engageable with each other.

As shown in FIG. 4, when the second component 20 is in the locked position, the first part 21 can abut against the second end 12 to remind the user that the second component 20 has been switched from the unlocked position to the locked position.

Further, the through hole 13 penetrates through two opposite sides of the second end 12 of the first component 10 along a longitudinal axis L13, and the second component 20 is configured to be movable relative to the through hole 13 along the longitudinal axis L13 to be switched between the unlocked position and the locked position.

In addition, the inner wall of the through hole 13 is further provided with at least one positioning groove 132 adjacent to the first engaging portion 131. The second part 22 forms a penetrating hole 222 along a radial direction of the longitudinal axis L13 and includes a positioning assembly 23 arranged in the penetrating hole 222. The positioning assembly 23 selectively abuts against the at least one positioning groove 132 as the second component 20 moves relative to the through hole 13.

In this embodiment, the penetrating hole 222 may penetrate through two opposite sides of the second part 22, The at least one positioning groove 132 may include first and second positioning grooves 132 spaced from each other. The positioning assembly 23 may include two positioning members 231 selectively abutting against the first and second positioning grooves 132, and a biasing member 232 biasing the two positioning members 231 toward the first and second positioning grooves 132.

As shown in FIG. 3, the two positioning members 231 abuts against the first positioning groove 132 when the second component 20 is in the unlocked position, and as shown in FIG. 4, the two positioning members 231 abuts against the second positioning groove 132 when the second component 20 is in the locked position.

Further, the two positioning members 231 in this embodiment may be respectively in the shape of balls, so that when the second member 20 is in the unlocked position, the frictional force between the through hole 13 and the second part 22 can be reduced to provided a smooth relative rotation. The biasing member 232 in this embodiment may be a compression spring, and two opposite ends of the biasing member 232 elastically abut against the two positioning members 231, respectively.

In this embodiment, the second component 20 may form an annular groove 223 on the outer periphery of the second part 22, and the second component 20 further includes a retaining member 24 that is fastened into the annular groove 223, thereby avoiding the second component 20 detaching from the through hole 13.

Figure 6:
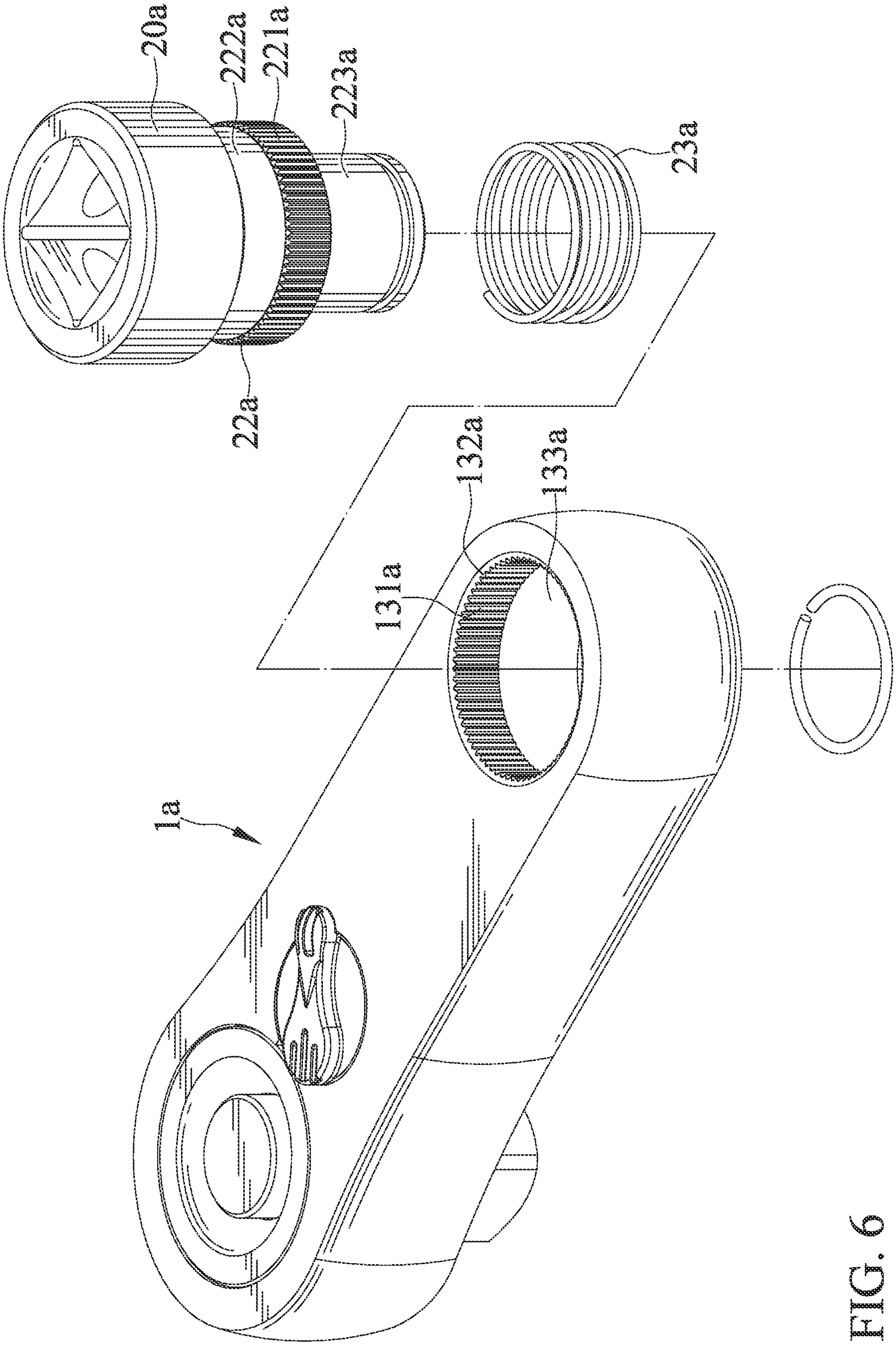
FIG. 6 is a partial exploded perspective view of a locking device of a second embodiment according to the present invention.
Figure 7:
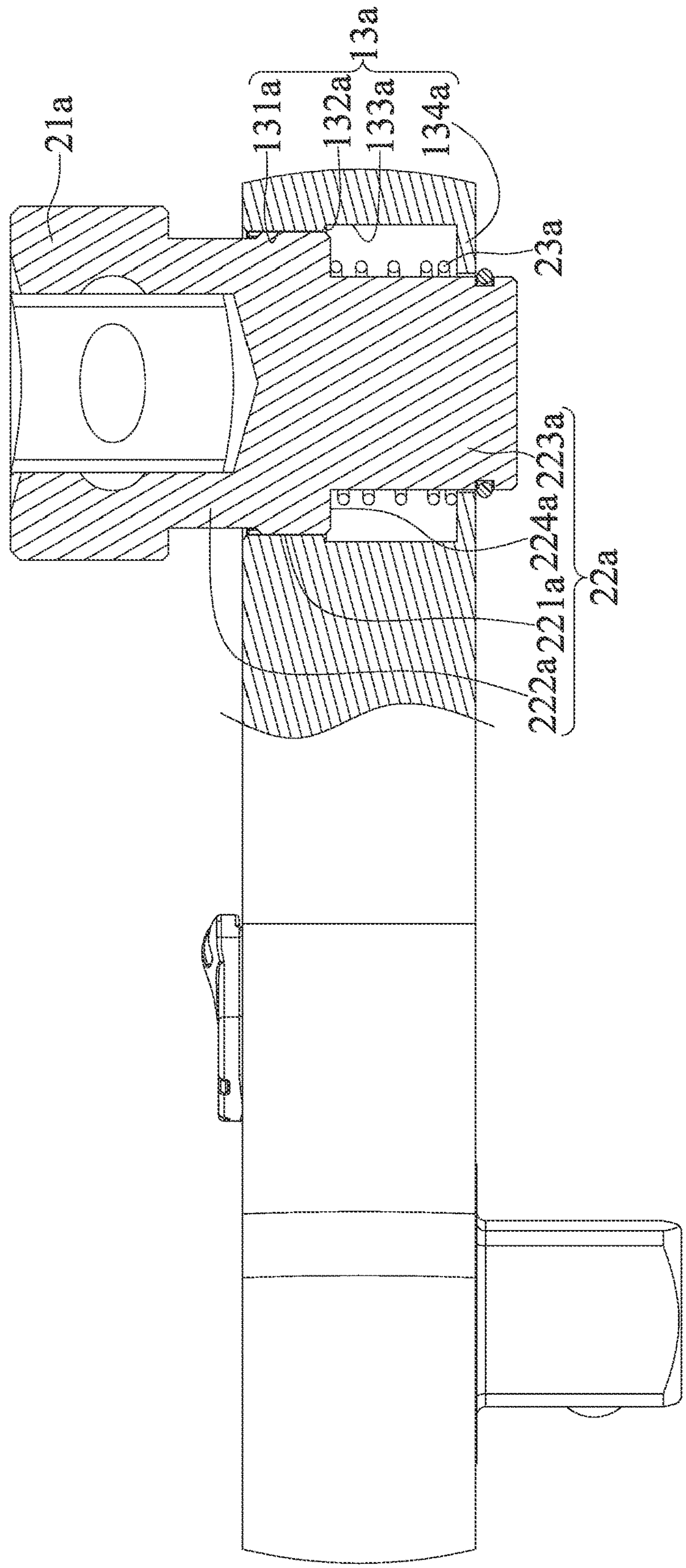
FIG. 7 is a cross sectional view of the locking device of FIG. 6 and shows the second component disposed in the unlocked position.
Figure 8:
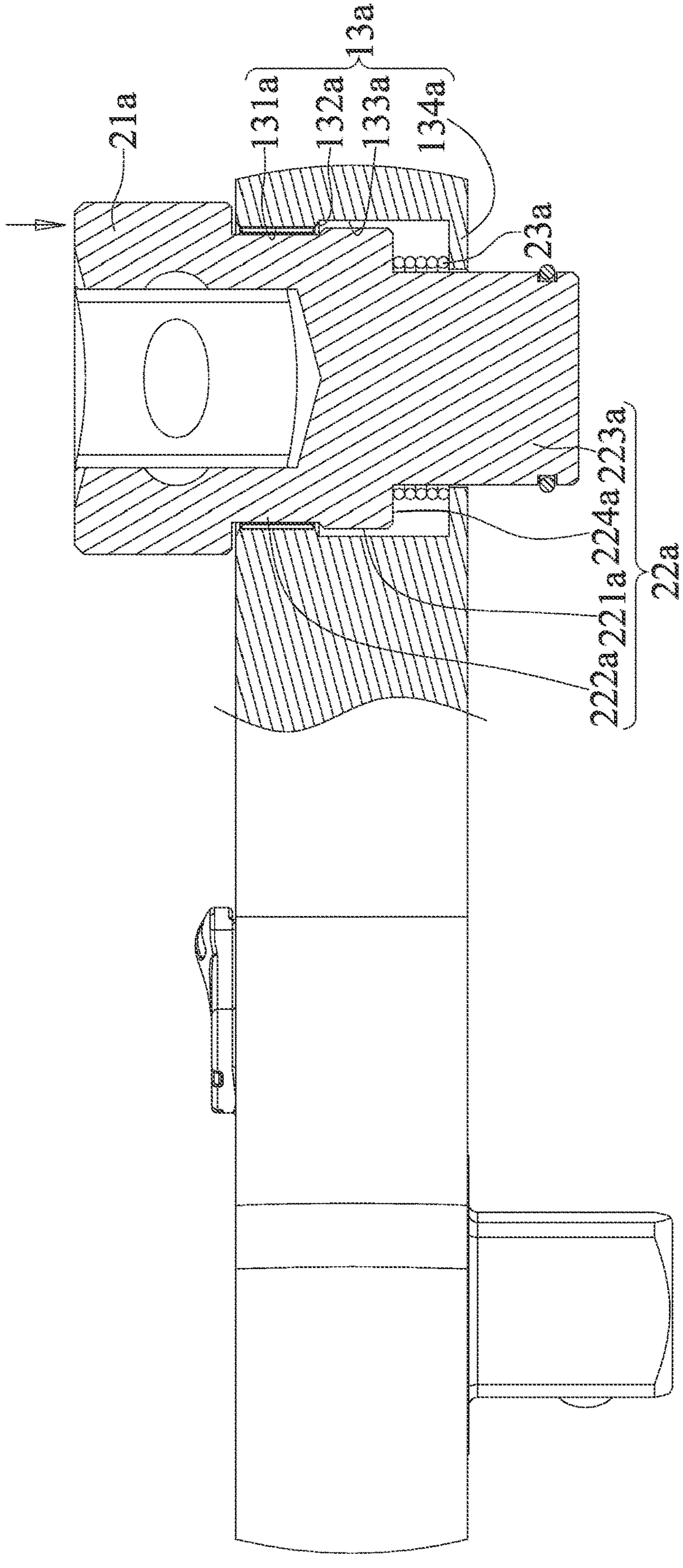
FIG. 8 is another cross sectional view of the locking device of FIG. 6 and shows the second component disposed in the locked position.

FIGS. 6-8 show a locking device 1*a* of a second embodiment according to the present invention. The second embodiment is substantially the same as the first embodiment. The main differences are that the through hole 13*a* has a small diameter section 132*a*, a large diameter section 1133*a* communicating with the small diameter section 132*a*, and an internal extended section 134*a* formed at one side of the large diameter section 133*a* opposite to the small diameter section 132*a*. The first engaging portion 131*a* is formed on the small diameter section 132*a*. The second part 22*a* has a large diameter portion 222*a*, a small diameter portion 223*a* connected to the large diameter portion 222*a*, and a shoulder portion 224*a* formed between the large diameter portion 222*a* and the small diameter portion 223*a*. The second engaging portion 221*a* is formed on the large diameter portion 222*a*, The locking device 1*a* further includes an elastic member 23*a* having two opposite ends respectively elastically abutting against the internal extended section 134*a* and the shoulder portion 224*a* to bias the second component 20*a* toward the locked position.

As shown in FIG. 7, when the second component 20*a* is in the locked position, the first engaging portion 131*a* and the second engaging portion 221*a* are engaged each other, so that the through hole 13*a* and the second part 22*a* cannot rotate relative to each other. Further, the elastic member 23*a* is uncompressed in the locked position. As shown in FIG. 8, the user must apply force to the first part 21*a* of the second component 20*a*, to cause the second part 22*a* of the second component 20*a* moved relative to the through hole 13*a* and switched from the locked position to the unlocked position, so that the elastic member 23*a* is compressed and deformed by the shoulder portion 224*a*. At this time, the user needs to continue to apply force to make the through hole 13*a* and the second part 22*a* rotate relative to each other, Once the user stops applying force to the first part 21*a*, the elastic member 23*a* will elastically return to bias the second component 20*a* toward the locked position, so that the second component 20*b* is switched 17 from the unlocked position to the locked position.

Figure 9:
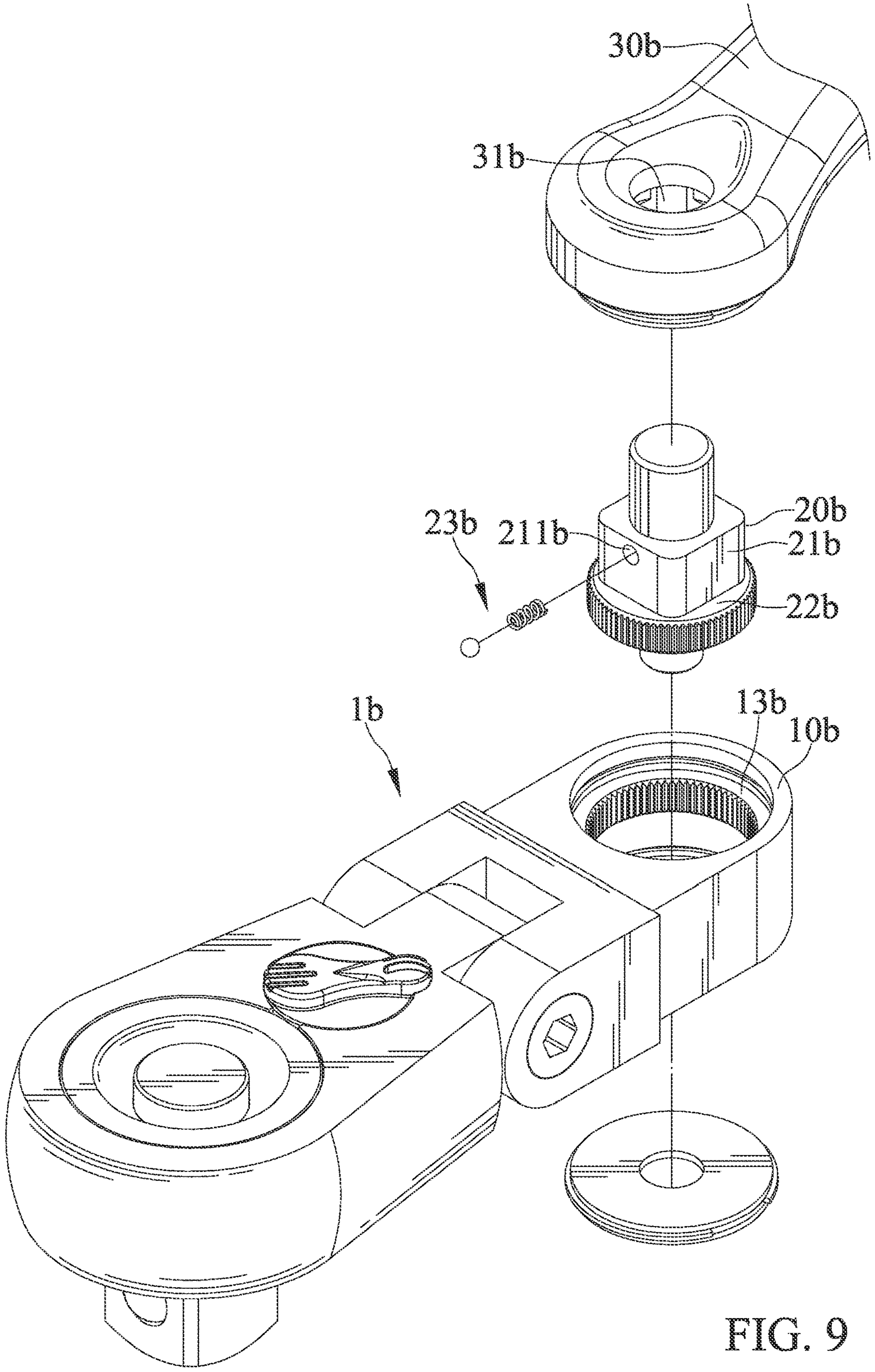
FIG. 9 is a partial exploded perspective view of a locking device of a third embodiment according to the present invention.
Figure 10:
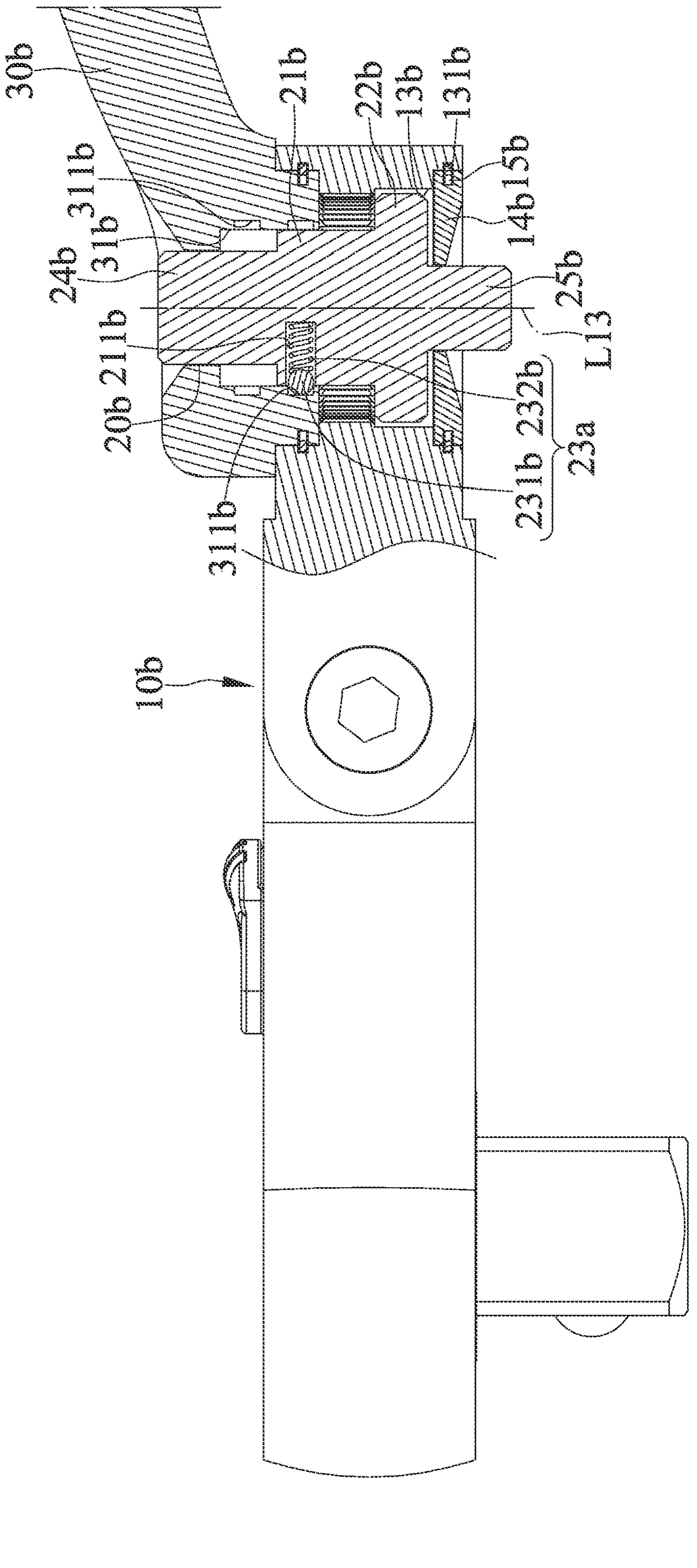
FIG. 10 is a cross sectional view of the locking device of FIG. 9 and to shows the second component disposed in the unlocked position.

FIGS. 9-10 show a locking device 1*b* of a third embodiment according to the present invention. The third embodiment is substantially the same as the first embodiment. The main differences are that the locking device 1*b* further includes a third component 30*b* pivotally connected to the second component 20*b*. The third component 30*b* forms a pivoting hole 31*b* aligned with the through hole 13*b* along the longitudinal axis L13. An inner wall of the pivoting hole 31*b* is provided with first and second positioning grooves 311*b* spaced from each other. The first part 21*b* of the second component 20*b* is selectively rotatably inserted through the pivoting hole 31*b* and the through hole 13*b*. The first part 21*b* forms a penetrating hole 211*b* along the radial direction of the longitudinal axis L13. The second component 20*b* further includes a positioning assembly 23*b* arranged in the penetrating hole 211*b*, and the positioning assembly 23*b* selectively abuts against one of the first and second positioning grooves 311*b* as the second component 20*b* moves relative to the through hole 13*b* and the pivoting hole 31*b*.

Figure 11:
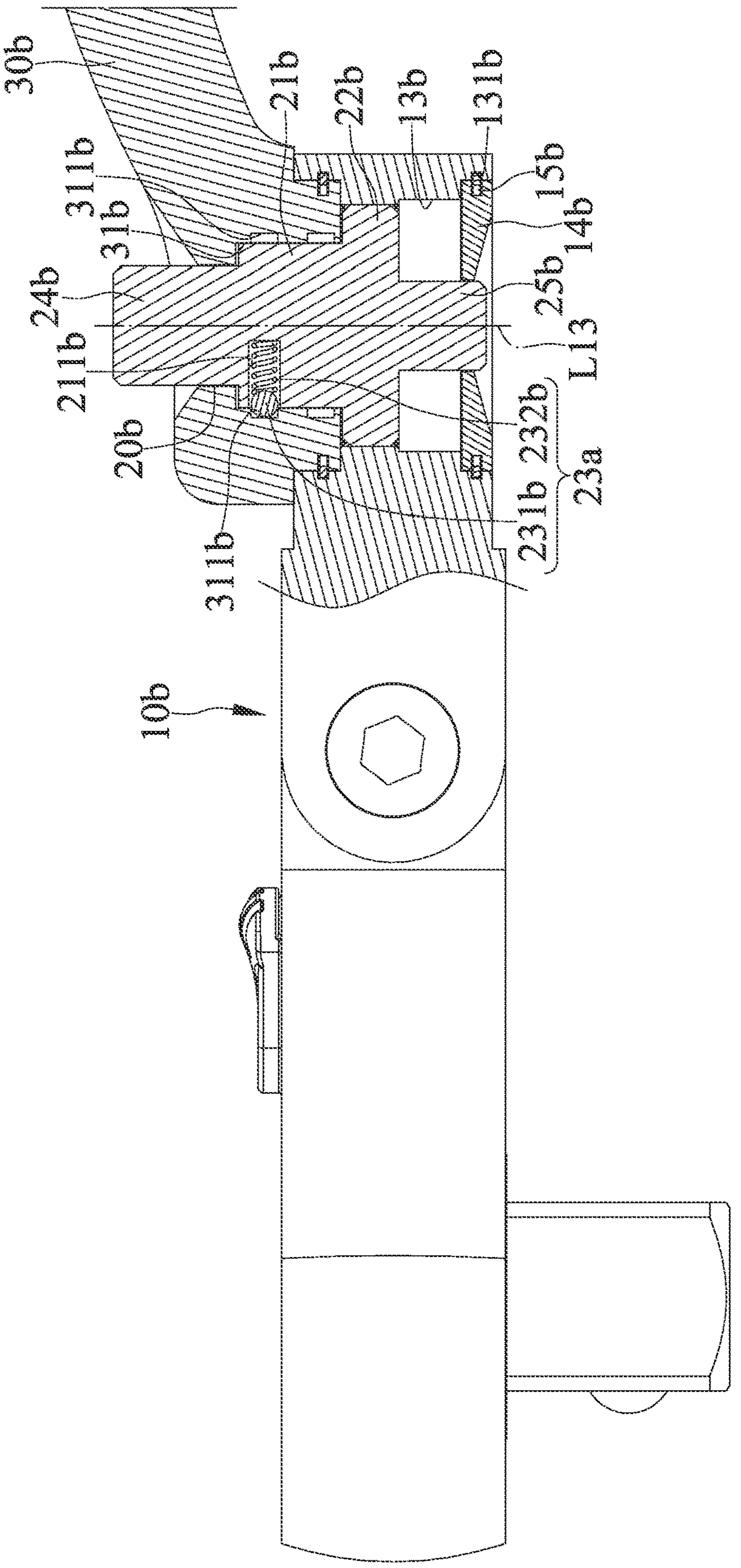
FIG. 11 is another cross sectional view of the locking device of FIG. 9 and shows the second component disposed in the locked position.

Further, the positioning assembly 23*b* includes a positioning member 231*b* selectively abutting against one of the first and second positioning grooves 311*b*, and a biasing member 232*b* biasing the positioning member 231*b* toward one of the first and second positioning grooves 311*b*. As shown in FIG. 10, the positioning member 231*b* abuts against the first positioning groove 311*b* when the second component 20*b* is in the unlocked position, and as shown in FIG. 11, the positioning member 231*b* abuts against the second positioning groove 311*b* when the second component 20*b* is in the locked position.

In addition, the first component 10*b* forms an annular groove 131*b* on the inner wall of the through hole 13*b*, and a cover 14*b* is connected to the first component 10*b* through a retaining member 15*b* that is fastened to the annular groove 131*b*. A first pressing portion 24*b* and a second pressing portion 25*b* are formed on the first part 21*b* and the second part 22*b* of the second component 20*b* respectively extending along the longitudinal axis L13. The first pressing portion 24*b* and the second pressing portion 25*b* are adapted to be pressed by the user to cause the second component 20*b* switched between the unlocked position and the locked position, and the first pressing portion 24*b* and the second pressing portion 25*b* selectively protrude from the pivoting hole 31*b* and the through hole 13*b* as the second component 20*b* moves relative to the through hole 13*b*.

In this embodiment, the first component 10*b* may be a swing wrench, and the third component 30*b* may be a handle and is pivotally connected with the second component 20*b*. Therefore, the third component 30*b* can selectively pivot with the first component 10*b* via the second component 20*b* to adjust or lock the relative angle.

In the above embodiments, the second component 20, 20*a*, 20*b* is selectively rotatably connected to the through holes 13, 13*a*, 13*b* of the first component 10, 10*b*, and the second component 20, 20*a*, 20*b* is movable relative to the through hole 13, 13*a*, 13*b* to be switched between the unlocked position and the locked position to control whether the through hole 13, 13*a*, 13*b* and the second component 20, 20*a*, 20*b* can rotate relative to each other. Thus, the angle between the first component 10, 10*b* and the second component 20, 20*a*, 20*b* can be adjusted or locked.

Although specific embodiments have been illustrated and described, numerous modifications and variations are still possible without departing from the scope of the invention. The scope of the invention is limited by the accompanying claims.

The invention claimed is:

1. A locking device, comprising:

a first component having a through hole, wherein an inner wall of the through hole is provided with a first engaging portion, wherein the first component defines a first end and a second end spaced from the first end, wherein the through hole is formed on the second end and penetrates through two opposite sides of the second end along a longitudinal axis of the through hole, wherein the through hole has a small diameter section, a large diameter section communicating with the small diameter section, where the small diameter section is smaller than the large diameter section, and an internal extended section formed at a terminal end of the large diameter section opposite to the small diameter section, wherein the first engaging portion is formed on the small diameter section; and a second component selectively rotatably connected to the through hole and provided with a second engaging portion detachably engaged with the first engaging portion, wherein the second component is configured to be movable relative to the through hole along the longitudinal axis to be switched between an unlocked position where the second engaging portion is disengaged from the first engaging portion and a locked position where the second engaging portion is engaged with the first engaging portion, so that the second component and the through hole are selectively rotatable relative to each other, wherein the second component has a first part and a second part connected to the first part, wherein the second part is selectively rotatably connected to the through hole, wherein the second engaging portion is formed on an outer periphery of the second part, wherein the second part has a large diameter portion, a small diameter portion connected to the large diameter portion, and a shoulder portion formed between the large diameter portion and the small diameter portion, wherein the large diameter portion is larger than the small diameter portion, wherein the second engaging portion is formed on the large diameter portion, and wherein the locking device further includes an elastic member having two opposite ends respectively elastically abutting against the internal extended section and the shoulder portion to bias the second component toward the locked position.

2. The locking device as claimed in claim 1, wherein the first engaging portion and the second engaging portion respectively have a plurality of teeth being engageable with each other.

3. The locking device as claimed in claim 1, wherein the inner wall of the through hole is further provided with at least one positioning groove adjacent to the first engaging portion, wherein the second part forms a penetrating hole along a radial direction of the longitudinal axis and includes a positioning assembly arranged in the penetrating hole, and wherein the positioning assembly selectively abuts against the at least one positioning groove as the second component moves relative to the through hole.

4. The locking device as claimed in claim 3, wherein the penetrating hole penetrates through two opposite sides of the second part, wherein the at least one positioning groove includes first and second positioning grooves spaced from each other, wherein the positioning assembly includes two positioning members selectively abutting against the first and second positioning grooves, and a biasing member biasing the two positioning members toward the first and second positioning grooves, wherein the two positioning members abuts against the first positioning groove when the second component is in the unlocked position, and wherein the two positioning members abuts against the second positioning groove when the second component is in the locked position.

5. A locking device, comprising:

a first component having a through hole, wherein an inner wall of the through hole is provided with a first engaging portion, wherein the first component defines a first end and a second end spaced from the first end, wherein the through hole is formed on the second end and penetrates through two opposite sides of the second end along a longitudinal axis of the through hole;

a second component selectively rotatably connected to the through hole and provided with a second engaging portion detachably engaged with the first engaging portion, and wherein the second component is configured to be movable relative to the through hole along the longitudinal axis to be switched between an unlocked position where the second engaging portion is disengaged from the first engaging portion and a locked position where the second engaging portion is engaged with the first engaging portion, so that the second component and the through hole are selectively rotatable relative to each other, wherein the second component has a first part and a second part connected to the first part, wherein the second part is selectively rotatably connected to the through hole, and wherein the second engaging portion is formed on an outer periphery of the second part; and a third component forming a pivoting hole aligned with the through hole along the longitudinal axis, wherein an inner wall of the pivoting hole is provided with first and second positioning grooves spaced from each other, wherein the first part of the second component is selectively rotatably inserted through the pivoting hole and the through hole, wherein the first part forms a penetrating hole along a radial direction of the longitudinal axis, wherein the second component further includes a positioning assembly arranged in the penetrating hole, and wherein the positioning assembly selectively abuts against one of the first and second positioning grooves as the second component moves relative to the through hole and the pivoting hole.

6. The locking device as claimed in claim 5, wherein the positioning assembly includes a positioning member selectively abutting against one of the first and second positioning grooves, and a biasing member biasing the positioning member toward one of the first and second positioning grooves, wherein the positioning member abuts against the first positioning groove when the second component is in the unlocked position, and wherein the positioning member abuts against the second positioning groove when the second component is in the locked position.

* * * * *